(12) United States Patent
Swenson et al.

(10) Patent No.: US 9,271,003 B2
(45) Date of Patent: Feb. 23, 2016

(54) REAL-TIME AUDIO OR VIDEO TRANSCODING

(75) Inventors: Erik R. Swenson, San Jose, CA (US); Nitin Bhandari, Fremont, CA (US); Vadim Arshanskiy, Santa Clara, CA (US)

(73) Assignee: Opera Software Ireland Limited, Dublin (IE)

( * ) Notice: Subject to any disclaimer, the term of this patent is extended or adjusted under 35 U.S.C. 154(b) by 986 days.

(21) Appl. No.: 13/434,764

(22) Filed: Mar. 29, 2012

(65) Prior Publication Data

US 2012/0263241 A1 Oct. 18, 2012

Related U.S. Application Data

(60) Provisional application No. 61/476,215, filed on Apr. 15, 2011.

(51) Int. Cl.
| | | |
|---|---|---|
| H04N 7/26 | (2006.01) | |
| H04N 19/132 | (2014.01) | |
| H04N 19/172 | (2014.01) | |
| H04N 19/46 | (2014.01) | |
| H04N 19/61 | (2014.01) | |
| H04N 19/152 | (2014.01) | |
| H04N 19/192 | (2014.01) | |
| H04N 19/40 | (2014.01) | |

(52) U.S. Cl.
CPC ........... *H04N 19/132* (2014.11); *H04N 19/152* (2014.11); *H04N 19/172* (2014.11); *H04N 19/192* (2014.11); *H04N 19/40* (2014.11); *H04N 19/46* (2014.11); *H04N 19/61* (2014.11)

(58) Field of Classification Search
CPC . H04N 19/152; H04N 19/172; H04N 19/192; H04N 19/40; H04N 19/46; H04N 19/61; H04N 19/32

USPC .................................................... 375/240.26
See application file for complete search history.

(56) References Cited

U.S. PATENT DOCUMENTS

| | | | |
|---|---|---|---|
| 6,693,959 B1 | 2/2004 | Eckart et al. | |
| 6,751,405 B1 * | 6/2004 | Hasegawa | 386/329 |
| 7,356,079 B2 | 4/2008 | Laksono et al. | |
| 2009/0022218 A1 * | 1/2009 | Kim et al. | 375/240.03 |
| 2010/0166387 A1 | 7/2010 | Miyake et al. | |
| 2011/0264676 A1 * | 10/2011 | Belan et al. | 707/756 |
| 2011/0280216 A1 | 11/2011 | Li et al. | |

FOREIGN PATENT DOCUMENTS

WO    WO 2008/067108 A2    6/2008

OTHER PUBLICATIONS

PCT International Search Report and Written Opinion, PCT Application No. PCT/US2012/033654, Jul. 27, 2012, 14 pages.
U.S. Appl. No. 61/334,548, filed May 13, 2010, Inventors S. Li et al.

* cited by examiner

*Primary Examiner* — William C Vaughn, Jr.
*Assistant Examiner* — Naod Belai
(74) *Attorney, Agent, or Firm* — Fenwick & West LLP

(57) ABSTRACT

A system and a method are disclosed for transcoding video files on a server such that they can be streamed to a client device in substantially real-time. The server receives a video file a uses a prediction algorithm to predict each video frame's size based on encoding and streaming parameters associated with the input file and an output stream and transcoding each video frame. If a transcoded frame is too large, it is compressed further, if it is too small, the video file is padded. As such, each video frame transcoded or padded until the encoded frame is the same size as a predicted size. The transcoded frames are streamed to a client device to enable the client to device to playback the video after requesting it from the server.

17 Claims, 5 Drawing Sheets

REAL-TIME AUDIO OR VIDEO TRANSCODING

CROSS REFERENCE TO RELATED APPLICATIONS

This application claims the benefit of U.S. Provisional Application No. 61/476,215 filed Apr. 15, 2011, which is incorporated by reference in its entirety.

BACKGROUND

1. Field of Art

The disclosure generally relates to the field of encoding audio and video files.

2. Description of the Related Art

Users of computing devices commonly view videos and listen to audio on their computing devices. Generally, users download an audio and/or a video file on their computing device and execute the file to hear or view the content of the file. Such a system of viewing content is disadvantageous because it requires a user to wait for a file to download before the user can view the file. Additionally, such a system of consuming audio and/or video files is not practicable when an audio or video file is embedded on a webpage.

To overcome these shortcomings, some systems enable users to stream audio or video files from a server. However, depending on the size of the audio/video files and the quality of network connection between the user's computing device and a server, the audio/video files may take too long to stream and therefore may interrupt a user's playback stream. As a result, servers generally transcode audio/video files to an appropriate size to provide an uninterrupted playback stream to the user. In such a system, a user does not have to wait a substantial period of time because the server downloads and transcodes the file in substantially real time and the user's computing device downloads the transcoded stream and plays it back to the user in substantially real time.

Certain file formats, however, such as MP4, Quick Time File Format (MOV), Third Generation Partnership Project (3GP), etc require specifying a size and location of every audio and/or video sample contained in the file to execute or playback the file. If such files are transcoded, users' computing devices are unable to stream them in real time. For example, a server transcoding such file formats does not know the size and location of every audio and/or video sample contained in the file until the entire file is transcoded. Thus, a computing device cannot stream the audio/video file until the server has transcoded the entire file and has provided the size and location data of each audio/video sample to the computing device. Thus, a user who wants to stream such a file format from a server transcoding the file, would have to wait a period of time to allow the server to transcode the file and provide size and location data of samples within the file. Such waiting periods negatively impacts a user's playback experience.

Some transcoding servers may overcome the problem by caching and transcoding video files before any user requests the file. As such, the server may be able to send the transcoded video stream and the size and location data of each sample of the file as soon as the user's computing device requests it. However, such a process is disadvantageous because it requires the server to accurately predict which videos a user may want to watch at a later time. Additionally, such a process is also cumbersome as the server may have to cache a large number of video files that a user may potentially want to view, in order to provide a seamless playback experience to its users.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
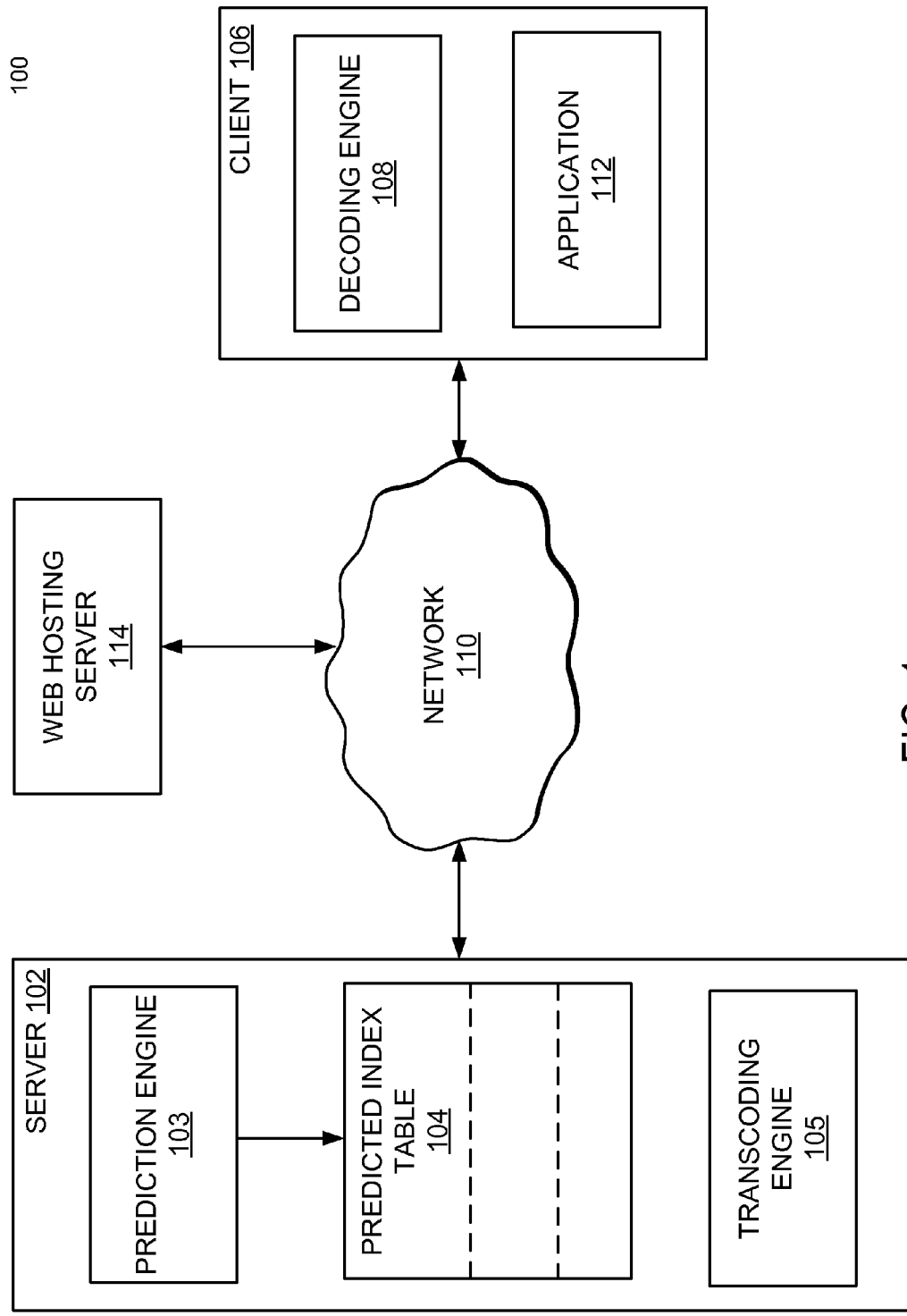
FIG. 1 is a high-level block diagram of a computing environment according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The present invention is now described more fully with reference to the accompanying Figures, in which one or some embodiments of the invention are shown. The present invention may be embodied in many different forms and should not be construed as limited to the embodiments set forth herein. Rather these embodiments are provided so that this disclosure will be complete and will fully convey principles of the invention to those skilled in the art.

For illustrative purposes, embodiments of the invention are described in connection with a server or a mobile client device, such as an example mobile client device. Various specific details are set forth herein regarding embodiments with respect to servers and mobile client devices to aid in understanding the present invention. However, such specific details are intended to be illustrative, and are not intended to restrict in any way the scope of the present invention as claimed herein. In particular, one skilled in the art will recognize that the invention can be used in connection with a wide variety of contexts, including, for example, client devices operating in a wired network. In addition, embodiments of the invention are described in connection with a web browsing application, but such descriptions are intended to be illustrative and examples, and in no way limit the scope of the invention as claimed. Various embodiments of the invention may be used in connection with many different types of programs, including an operating system (OS), a wide variety of applications, including word processing, spreadsheet, presentation, and database applications, and so forth.

In some embodiments, the present invention is implemented at least partially in a conventional server computer system running an OS, such as a Microsoft OS, available from Microsoft Corporation; various versions of Linux; various versions of UNIX; a MacOS, available from Apple Computer Inc.; and/or other operating systems. In some embodiments, the present invention is implemented in a conventional personal computer system running an OS such as Microsoft Windows Vista or XP (or another Windows version), MacOS X (or another MacOS version), various versions of Linux, various versions of UNIX, or any other OS designed to generally manage operations on a computing device.

In addition, the present invention can be implemented on, or in connection with, devices other than personal computers, such as, for example, personal digital assistants (PDAs), cell phones, computing devices in which one or more computing resources is located remotely and accessed via a network, running on a variety of operating systems. The invention may be included as add-on software, or it may be a feature of an application that is bundled with a computer system or sold separately, or it may even be implemented as functionality embedded in hardware.

Output generated by the invention can be displayed on a screen, transmitted to a remote device, stored in a database or other storage mechanism, printed, or used in any other way. In addition, in some embodiments, the invention makes use of input provided to the computer system via input devices such as a keyboard (screen-based or physical, in a variety of forms), scroll wheels, number pads, stylus-based inputs, a touchscreen or touchpad, etc. Such components, including their operation and interactions with one another and with a central processing unit of the personal computer, are well known in the art of computer systems and therefore are not depicted here.

Any software portions described herein with reference to modules need not include discrete software modules. Any software configuration described herein is meant only by way of example; other configurations are contemplated by and within the scope of various embodiments of the present invention. The term, engine, is used herein to denote any software or hardware configuration, or combination thereof, that performs the function or functions referenced.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment. The appearance of the phrase "in some embodiments" in various places in the specification are not necessarily all referring to the same set of embodiments. The appearance of the phrase "in various embodiments" in various places in the specification are not necessarily all referring to the same set of embodiments.

Embodiments of disclosed system, method and computer readable storage medium seek to receiving metadata associated with a sample, wherein the metadata comprises a size of at least one input frame in the sample. Additionally, a size of an output frame encoded from an input frame in the sample is predicted, wherein the output frame is decodable by a client device. In one embodiment, the input frame is encoded, wherein the size of the encoded frame is compared to the predicted size of an output frame. If the encoded frame is smaller than the predicted size of the output frame, the encoded frame is padded to match the size of the predicted output frame. If, however, the encoded frame is larger than the predicted size of the output frame, the encoded frame is re-encoded to match the size of the predicted output frame.

System Architecture

FIG. 1 is a high-level block diagram of a computing environment 100 according to one embodiment. It includes a server computing system 102 comprising a prediction engine 103, a predicted index table 104 and a transcoding engine 105, a client computing system 106 comprising a decoding engine 108 and an application 112, a web hosting server computing system 114, and a network 110 connecting the server 102 and the client 106.

At a high level, responsive to a user request, an application 112 executing on a client device 106 requests to stream media sample (e.g., audio and/or video) content over the network 110. A media sample may include either an audio file, a video file or both. Responsive to the user request, the server 102 retrieves the audio/video file from an appropriate web hosting server 114. In one embodiment, the media files (e.g., audio file and/or video file) include certain file formats, such as MP4, Quick Time File Format (MOV), Third Generation Partnership Project (3GP), etc., and require specifying a size and location of every audio and/or video sample contained in the file to permit an application 112 to execute or playback the file. In such an instance, the prediction engine 103 predicts a number of output frames of the media file and the size each output frame of the media file and provides the data in a predicted index table 104. It should be noted that in one embodiment, the prediction engine 103 predicts the number and size of the output frames from metadata associated with the media file; as such the actual media frames may not be needed. Additionally, the media file, including audio file, video file or both, may be transcoded by the transcoding engine 105, wherein the frames may be further padded or compressed to match the entries in the predicted index table 104. Once the prediction engine 103 generates an index table of predicted size of each output frame of the media file, the index table is sent to the client 106. In addition, the encoded video frames are sent as each frame is generated. Once the transcoded frames match the entries in the predicted index table, the transcoded frames are sent to the client 106 via the network 110. A decoding engine 108 on the client 106 decodes the transcoded frames and the application 112 executing on the client plays the streaming media on the client 106. As such, a user is enabled to view a transcoded video stream in substantially real-time.

The network 110 represents the communication pathways between the client 106, the server 102 and the web hosting server 114. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The web hosting server 114 is an entity that provides webpages, media files and/or other electronic documents to clients 106. The web hosting server 114 can be, for example, a major Internet web site operated by a national media outlet, a personal blog on a web server operated by a lone individual, and/or another distributor of web pages. While only one web hosting servers 114 is shown in FIG. 1, embodiments of the environment 100 can have thousands or millions of different publishers. Only one web hosting server 114 is shown for purposes of clarity. This description uses the term "video" to refer to any electronic file, e.g., document, audio, or video file, and the like, served by a web hosting server 114, regardless of whether the document is technically a video file. For ease of discussion, the remainder of the description will reference video.

A server 102 represents an entity that receives video content requests from a client 106. FIG. 1 illustrates one server 102, embodiments however, can have many more participating servers. The server 102 retrieves video content responsive to a user request 102. A prediction engine 103 predicts the number and size of output frames based on the metadata associated with the requested video file. The predicted number and size information is stored in the predicted index table 104. Additionally, the video file is transcoded by the transcoding engine 105, wherein if the transcoded frame is smaller than the predicted value, the sample is padded up to the predicted size and if the transcoded frame is larger than the predicted value, it may be compressed and transcoded again. The process may continue until the transcoded frame is exactly the same size as the predicted value. In another embodiment, the process continues until the transcoded frame is substantially the same size as the predicted value. At such an instance, the transcoded frame is provided to the client 106 for streaming.

The client 106 represents a computing system (e.g., desktop, laptop, tablet, smartphone, etc.) operated by a user that receives video streams from the server 102. The client 106 is sometimes referred to as a "display device." In one embodiment, the client 106 includes a computer system utilized by an end-user to communicate with other computers on the network 110 in order to view an audio/video file. In other embodiments, the client 106 includes a network-capable device other than a computer system, such as a personal digital assistant (PDA), a cellular telephone, a smartphone, a pager, a television "set-top box" etc. Although FIG. 1 illustrates only one client device 106, embodiments of the present invention can have thousands or millions of client devices connected to the network 110. The decoding engine 108 of the client 106 decodes the transcoded video stream received from the server 102 and provides it to an application 112 executing on the client. The application 112 streams the decoded video file such that a user can view the contents of the file. The application 112 is any program capable of outputting audio samples, video samples or other data on the client device and may include a media player.

The system described herein provides a richer media streaming experience to an end-user of a client 106 by generating a index table before the media frames are transcoded at the server 102. As such, the server 102 does not have to wait to transcode an entire video file to determine the size and location of each transcoded frame. Therefore, a user may stream media files on a client 106 in substantially real time as the media files are transcoded by the server 102.

Example Computing Machine Architecture

Figure 2:
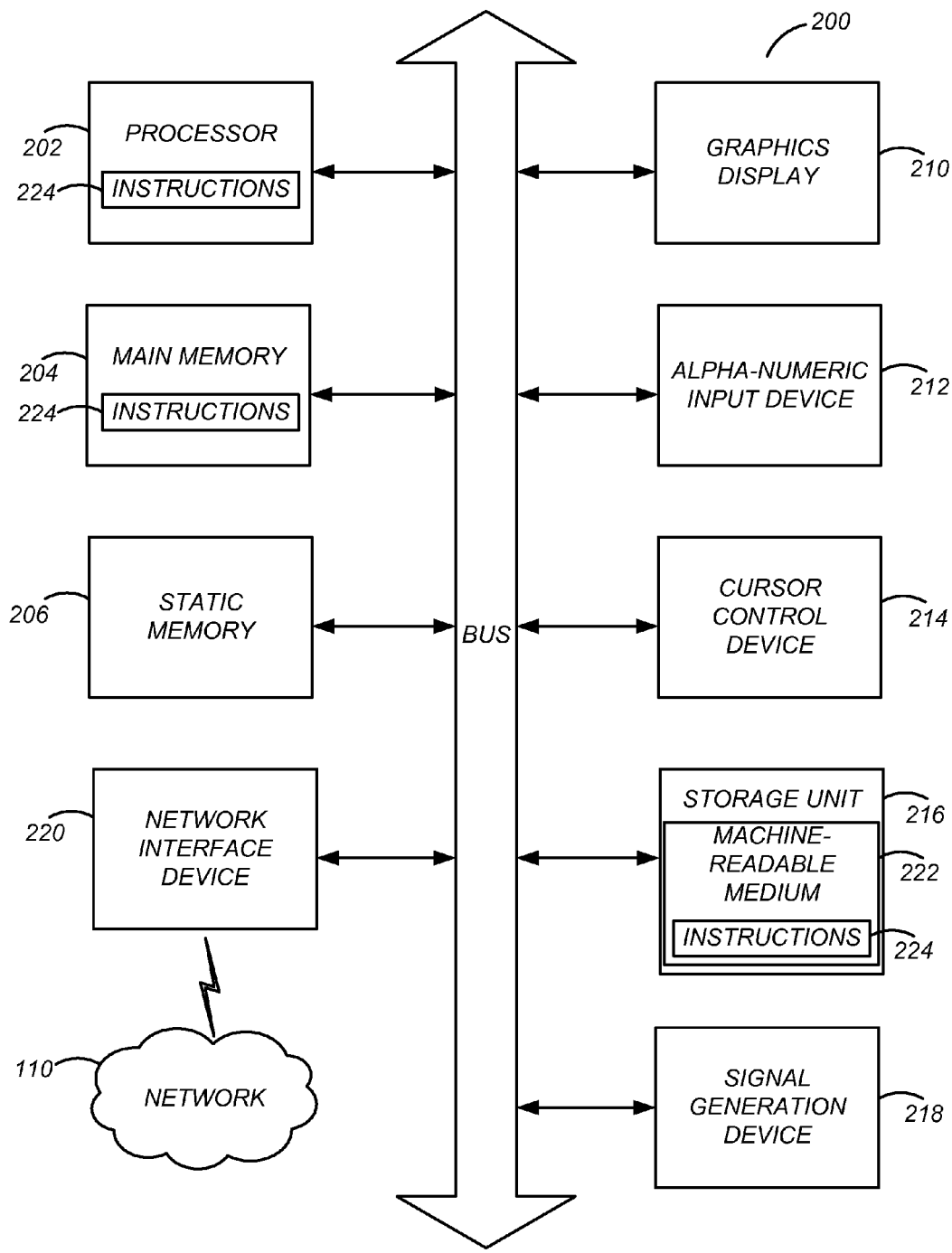
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine 200. It is noted that the computing machine 200 may be a system or part of a system, e.g., two or more machines operating together or one or more machines operating with one or more other devices. The computing entities illustrated in the environment 100 (e.g., server 102, client 106 and web hosting server 114) are structured similarly to the computing machine 200 and can be further customized for particular functional configurations (e.g., operations) as described further herein.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alterative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for Encoding Data

Figure 3:
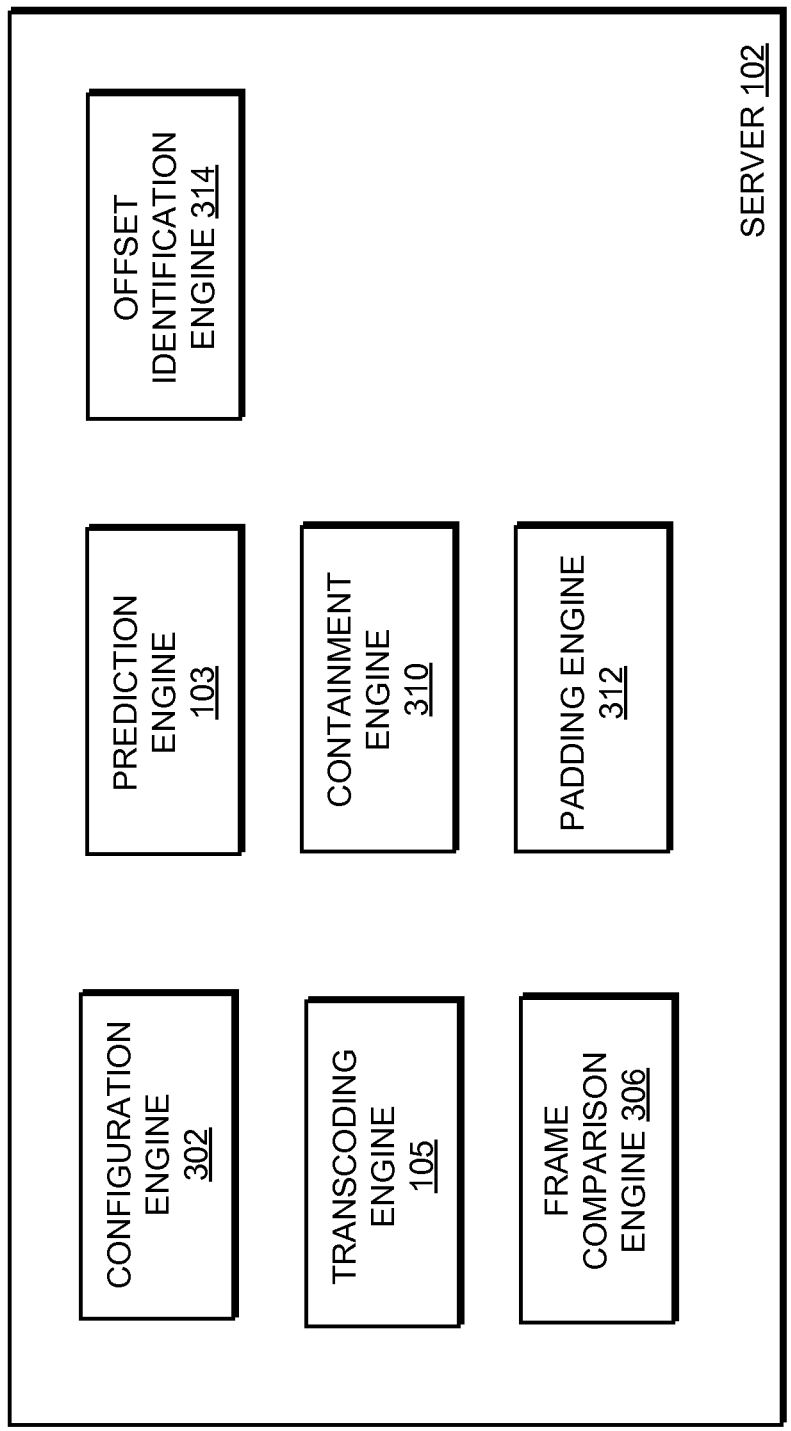
FIG. 3 illustrates one embodiment of a high level block diagram of a server for encoding audio or video files.

Referring now to FIG. 3, it illustrates an embodiment of the server 102. As noted previously, the server 102 is structurally configured similar to the computing machine 200 and further configured as noted herein. The server 102 is illustrated as a high-level block diagram of modules configured to encode media data of certain file format types, including but not limited to MPEG-4 (MP4), QuickTime File Format (MOV), Flash Video Container File Format (F4V), 3GPP File Format (3GP), M4V File Format. Upon reviewing the descriptions herein, those of skill in the art will recognize that other embodiments can have different and/or other modules than the ones described here, and that the functionalities can be distributed among the modules in a different manner. The server 102 includes a configuration engine 302, a transcoding engine 105, a frame comparison engine 306, a prediction engine 103, a containment engine 310, a padding engine 312 and an offset identification engine 314. The modules are configured to function and interoperate as described herein.

The configuration engine 302 parses a metadata block of a source file retrieved from a web hosting server 114. In one embodiment, the configuration engine 302 does not need the actual media frames, but parses data from metadata which is generally a first part of a streamable file. The configuration engine 302 processes each frame and keeps track of whether the sample will result in an output frame. For example, multiple frames can be used to generate one output frame. The size of each output frame is predicted by the prediction engine 103. In one embodiment, the configuration engine 302 sets an output configuration, including, for example, the output encoders to be used, the encoding profile/level and bitrates.

The prediction engine 103 predicts a size for each output frame based on metadata associated with source frame, including information on a sample size and/or type of frames in the source data and a predictive algorithm. A predicted index table 104 may be populated based on the values predicted by the prediction engine 103. In one embodiment, in order to predict the size of the transcoded output sample, the prediction engine looks at several factors associated with the source audio or video samples, including but not limited to source coder-decoder (CODEC), source profile, frame/sample rates and frame type.

In one embodiment, the prediction engine 103 predicts an output frame size based on the source CODEC. For example, if a source and destination CODECs match, no special considerations may required for individual frames. In such an instance, the efficiency of the source encoders I, P, B frames is very similar to the output encoder. If the source and destination CODECs are different, extra consideration may be taken by the prediction engine 103 based on the efficiency of source encoders associated with a file type. For example, H.264 is very efficient at encoding I frames and skip frames, thus, an MPEG2 source stream will have larger I frames relative to its P frames compared to an H.264 source stream.

In one embodiment, the prediction engine 103 predicts an output frame size based on a source profile. The prediction engine 103 determines a prediction for an output frame based on the type of frames in the source and the encoding of the source. In one instance, the prediction engine 103 may vary its prediction if the source has B frames, or arithmetic encoding that is different than the output encoder. For example, if B frames are not used in the output stream, a little extra budget can be used for the P frames since they are not as efficient.

In one embodiment, the prediction engine 103 predicts an output frame size based on frame/sample rates. The prediction engine 103 may determine an output frame based on source and destination frame requirements. If the source and destination frame or sample rates match, the prediction engine 103 applies no interpolation. If the source and destination frame or sample rates do not match, the prediction engine 103 may perform some interpolation. For example, if the source is 30 frames per second (fps) and the destination is 15 fps, the prediction engine 103 may average the size of the two source frames that will constitute the output frame.

In one embodiment, the prediction engine 103 predicts an output frame size based on the source frame type. A frame type may include B frames, I frames, P frames, etc. In one embodiment, the prediction engine 103 predicts an output frame size based on the input source frame type. For example, if an input frame is a key frame, the output frame is generally also set as a key frame. As such, the system preserves a seek capability wherein, the encoding may restart at the key frame if a user executes a seek operation. The transcoding associated with a seek operation is described in greater detail in the specification.

In another embodiment, the prediction engine 103 leaves some extra space in the table 104 periodically to allow the encoder to recover from repeated skips as described below. This might occur in a common place, for instance, if the source stream has a big frame followed by a skip frame or a small frame, the prediction engine 103 might allow some extra bits in the second frame in case the encoder cannot fit everything into a skip frame.

The prediction engine 103 may generate a fixed estimate of output size based on standard relationships between inputs and outputs. In another embodiment, the prediction engine 103 may use a calibration cycle to transcode a few samples of the output stream and use a ratio of input/output to tune the relationship between input and output. Such a calibration cycle provides for unaccounted differences in the two streams that can come from difference source and destination CODECs as well as encoder settings. As such, the prediction engine 103 builds a list of a list of sample sizes for the output stream using the relationships described herein. The output stream data is used is used to construct the MP4 metadata headers directly before the final output audio video samples are generated. Once the metadata is constructed, the MP4 headers are written. As described in greater detail in the specification, after the metadata is written, the encoded samples are written.

In one embodiment, the transcoding engine 105 encodes input frames. The encoding parameters may be provided by a server 102 and may vary based on the identity of the client 106 and a network connection established with the client. In one embodiment, a size predicted by the prediction engine 103 is provided to the transcoding engine 105, wherein the size of the encoded frame is compared to the size for the output frame predicted by the prediction engine 103.

In one embodiment, the transcoding engine may use the predicted output frame size as a start point for the bit budget. Encoders generally have a running bit budget that is used to adjust the compression strength to stay within a set bitrate. This mechanism can also be used to reset the bit budget on a frame-by-frame basis to more closely match the predicted frame size. In another embodiment, the existing bitrate budget is used to set the initial frame size.

In one embodiment, the transcoding engine uses the over/underage from the previous frames to adjust the compression strength. This enables the encoder get closer to the predicted bit budget by slewing to a more appropriate setting over time.

The containment engine 310 reduces the size of an encoded frame if it is larger than a size predicted by the prediction engine 103. In one embodiment, the containment engine 310 encodes a frame to reduce its size. For example, the target bit budget used by an encoder for the current frame and/or compression level is changed to reduce the size of the encoded frame, and then it is reprocessed. A frame can be reprocessed by the containment engine by re-encoding the frame or by quantizing the frame to reduce its bitrate. In one embodiment, the containment engine 310 may re-encode a frame to a higher bitrate if it is smaller than a size provided by the prediction engine 103. It is noted however, that the re-encoded frame with a higher bitrate may still be padded by the padding engine 312 as described in the specification below. In one embodiment, the amount of increase in compression can be gradual to prevent large jumps in quality. In another embodiment, the amount of increase in compression can be large to the frame size close to the output target in one step. In one embodiment, if the output target is not achieved within a number of reprocessing or re-encoding cycles, the containment engine 310 may use audio silence or a similar small audio frame or a skip frame. Video skip frames are the smallest frame and are designated to be an exact copy of the previous frame. If a video frame following the skip frame also does not fit in a budget provided by the prediction engine 103, it may be skipped by the containment engine also. Two or more consecutive skips sent to a client device may cause the video to appear frozen to a user. In order to overcome consecutive skips, the containment engine 310 may allow a portion of a video frame to get updated. In subsequent frames, the remaining parts of the frame can be encoded while keeping the previous parts as skips, permitting a progressive update of a frame. In another embodiment, the prediction engine 103 leaves some extra space periodically to allow the encoder to recover from repeated skips, as described above. In one embodiment, the containment engine 310 uses extra space to fit a second frame that cannot be reduced to a size provided by the prediction engine 103.

The frame padding engine 312 pads a frame if a generated frame is smaller than a size provided by the prediction engine 103. Encoding formats typically allow for opaque user data. This typically is used for ID3 codes, encoder settings, copyrights, etc. The data is not decodable by the decoder, so it skips these blocks. Thus, in one embodiment, the frame padding engine 312 pads a frame by adding the opaque user data. In one embodiment, for H.264 format, the frame padding engine 312 uses Supplemental Enhancement Information (SEI) NALs. These blocks can be variable size, so fit into the extra space. In another embodiment, for AAC format, the frame padding engine 312 uses data stream elements or fill structures to pad a frame. In another embodiment, for MPEG4 part 2 video, the frame padding engine places bytes of zero before or after a video sample to pad the frame. A decoder will skip these unknown data blocks stuffed with bytes of zero. In some embodiments, decoders will want the padding to be before the actual sample, in other embodiment, players want it after. In such instances, the frame padding engine 312 looks at a user agent or another method of identifying a device/player executing on the client device to select a proper scheme if needed. In yet another embodiment, the frame padding engine 312 applies a compression step to the padded samples. The padded data can be constructed to contain repeating data. The entire video clip can be fed through a streamable compression engine like GZIP. In one instance, the MP4 file will be downloaded by a browser and then fed to a media player. Modern browsers support HTTP GZIP content. In one embodiment, by using gzip (or similar) compression, the overhead of the padding is mitigated or eliminated.

The offset identification engine 314 identifies key frames to start encoding from a seek point requested by a user. In one embodiment, the offset identification engine 314 receives a seek time requested by a user and converts it to a byte in a video stream. The offset identification engine 314 further identifies a key frame before the requested byte in the video stream and encodes from the key frame. In one embodiment, the offset identification engine 314 transcodes from an I frame and not a P frame. The transcoded stream may be stored in an egress cache, but a decoder on a client device is provided transcoded video from the seek requested byte in the video stream. In one embodiment, the offset identification engine 314 identifies an I frame before the seek byte in order to permit the prediction engine 103 to generate an output header from the I frame. In one embodiment, the offset identification engine 314 may be on the server 106 or may be executing remotely.

In an embodiment encoded content is stored in an egress cache, if a new request from client 106 comes in for a portion of the file that has already been transcoded, the request can be satisfied directly from the egress cache without having to re-transcoded the video again. In an embodiment, wherein a seek request is provided by the client, the offset identification engine 314 determines whether a byte range requested in the seek request exists in the egress cache. It the byte range does not exists in the egress cache, the video may be transcoded from before or at the seek point as described in the specification. In one embodiment, the video is transcoded from or before the seek point until it reaches a byte range provided in the egress cache of another transcoding session. As such, the offset identification engine 314 prevents two transcoding sessions from transcoding a same portion of the file. In one embodiment, the egress cache is populated even if the client 106 disconnects, enabling new request for the same file to be satisfied by the egress cache. For instance, if the transcoding is stopped at a byte range when a user disconnects, the transcoded file may not be useful to another user who may view the transcoded file to a later point. In one embodiment, an ingress cache maintains files downloaded from the web hosting server 114. Thus if another request for the same file is received from the client computing device, the file is retrieved from the ingress cache as opposed to from the web hosting server 114.

Process for Media Transcoding

Figure 4:
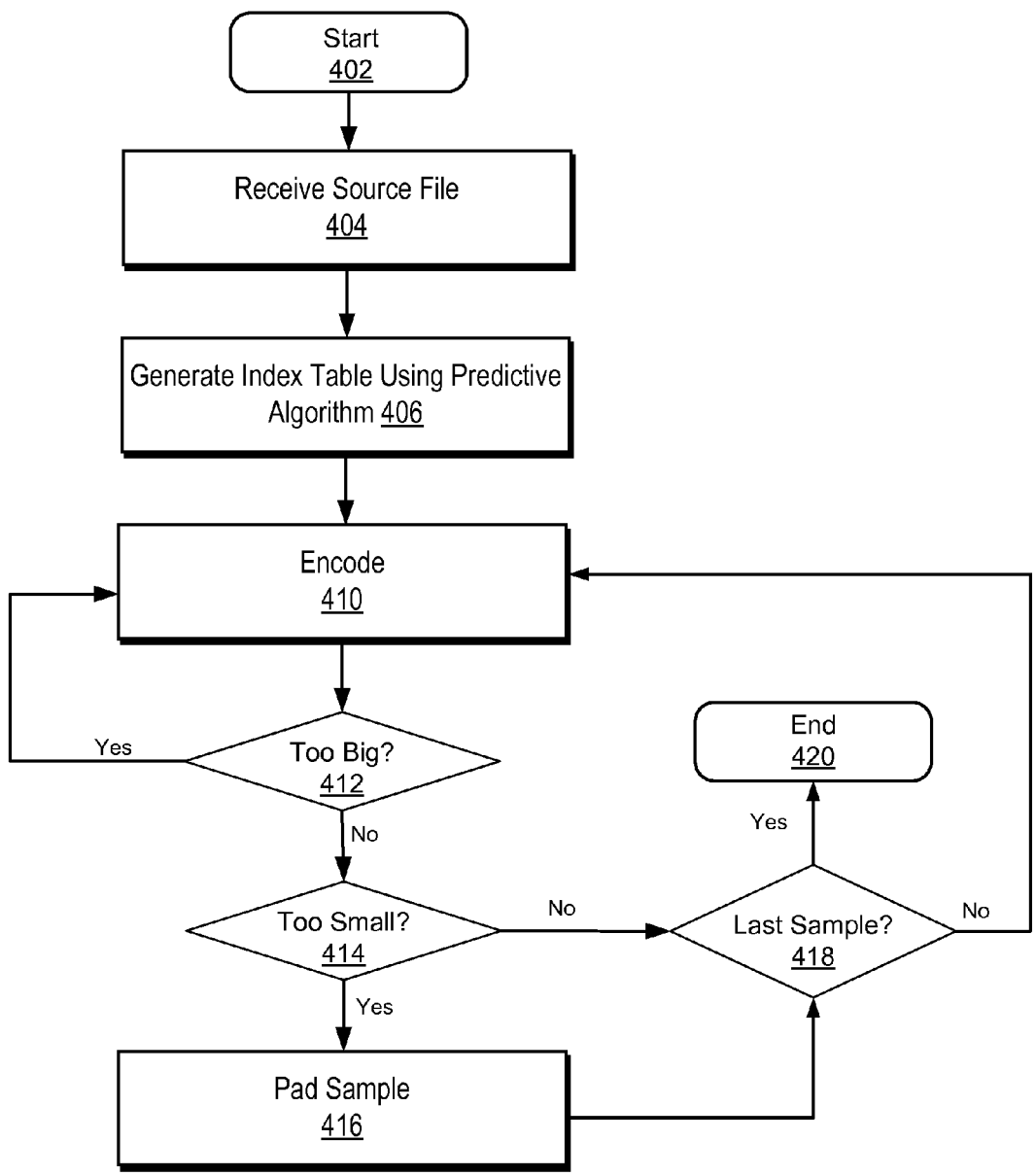
FIG. 4 illustrates one embodiment of a process for encoding audio or video files.

FIG. 4 is a flow chart illustrating a process for encoding audio or video files, according to one embodiment. The process starts 402 when it receives 404 a source file or a source index table associated with an incoming stream. The source index table may be a source file metadata block which is parsed to extract a size of each input audio or input video frame. It is noted that the actual input audio or input video frame is not need to exact its size. Each input frame is processed to determine whether it will result in an output frame as multiple input frames may be used to generate one output frame.

In one embodiment, the process uses a prediction algorithm to predict 406 a size of each output frame. The predicted output size may vary based on various factors, including but not limited to a difference in the input and output CODEC. For example, if input and output source CODECs match, special compression rules may not be required for individual frames. However, if the input frame format encodes differently than a output frame format, the process may predict a relatively larger or smaller size for the output frame. Similarly, if the input frame profile has a different profile than an output frame, the process may predict 406 a larger or a smaller size depending on the known differences between the input and output frame profiles. The process may predict a size based on frame and sample rates of the input and output frames. For example, if the input sample rate is higher than an output sample rate, the process predicts 404 that more than one input frame will constitute one output frame. Finally, the process may predict 404 a size for an output frame based on a type of frame. For example, key frames may be encoded differently than other frames.

In one embodiment, the predicted output frame size is provided to an encoder along with input frames. The process continues by encoding 410 the input frames. The encoding process may comprise converting an input frame into an output frame. In one embodiment, the encoded frame size is compared to the predicted output frame size.

If the encoded frame is larger 412 than the predicted output frame size, the encoded frame is encoded 410 or compressed further. The process compares the re-encoded frame size to the predicted output frame size. If the re-encoded frame size is larger 412 than the predicted output frame size, the re-encoded frame is encoded 406 or compressed further. As such, the process may continue until the encoded frame is not larger than a predicted size. In one embodiment, the process sets a maximum number of re-encode attempts to a particular number. In such an instance, if a frame is re-encoded up to the maximum number of attempts and is still larger than a predicted output frame size, the process sets the frame as a skip frame or a dropped sample. Setting the sample to skip or dropped makes the output frame small. The process may additionally set a maximum retries flag to the frame. In another embodiment, if the maximum number of retries has been achieved, the process requests the encoder to abort the encoding process mid-frame. A result of the abort operation is a corrupted frame; however decoders receiving corrupted frames are generally able to manage a corrupted frame without errors.

If the encoded frame is smaller 414 than the predicted output frame size, the encoded frame is padded 416 up to a predicted size. The process of padding 416 the encoded frame may vary based on the file format of the encoded file. In one embodiment, the process adds to opaque user data typically used for ID3 codes, encoder settings, copyrights, etc. Opaque user data is not decodeable, thus a decoder executing on a client device typically skips the padded data. The padding processes for various file formats is described in greater detail in reference to FIG. 3.

If the encoded frame is not smaller 414 than the predicted output frame, the process determines if the frame is a last sample in 418 in an audio or video stream (e.g., a media stream). If the frame is not the last sample, the process continues to encode 410 the next frame in the audio or video stream. If however, the frame is the last sample in the video stream, the process ends 420.

Figure 5:
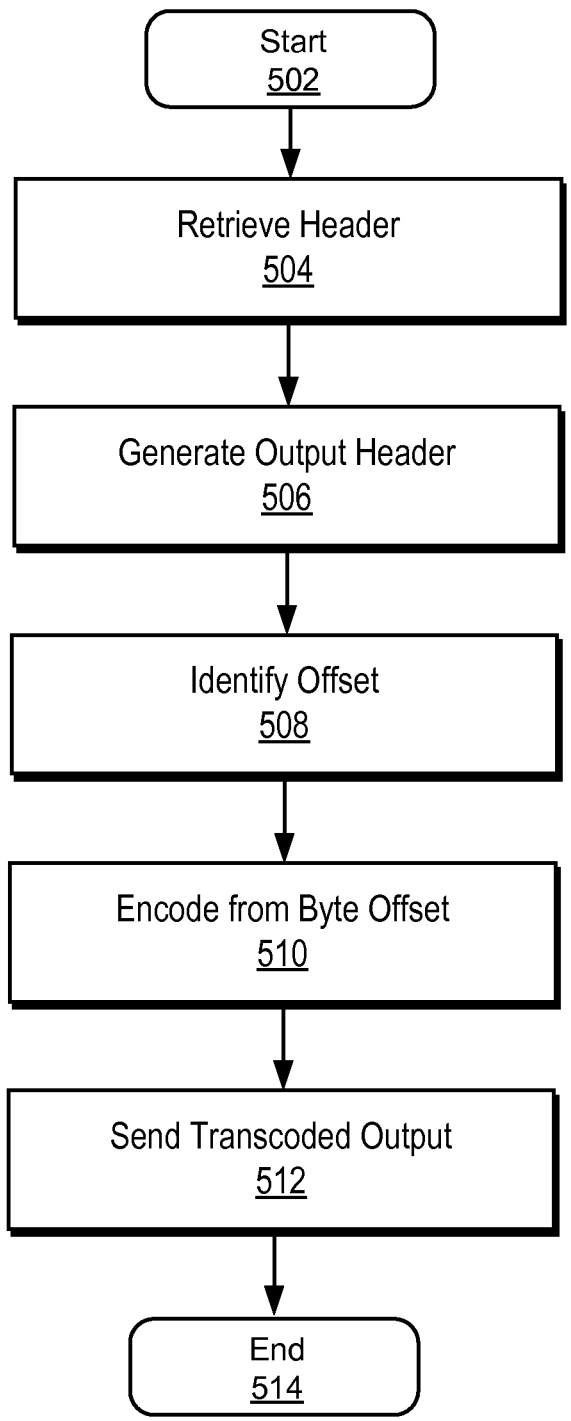
FIG. 5 illustrates an embodiment of a process for encoding an audio or video file wherein a user uses a seek operation.

FIG. 5 illustrates a process for encoding an audio or video file (e.g., a media file) wherein a user uses a seek operation, in accordance with an embodiment. In one embodiment, the process starts 502 when a user executes a seek operation on a client device that is requesting a portion of the encoded audio or video stream from the server 102. In such an instance, the process retrieves 504 header information associated with the audio or video file. The header information may be parsed to determine the size of each input audio and input video frame. Additionally, the header information may identify key frames such as I frames among the audio or video samples (e.g., media samples).

In one embodiment, the process uses a prediction algorithm to predict a size of each output frame. In another embodiment, the process caches sizes predicted 406 while producing a response to the original request and retrieves the cached size of the output frames. The predicted output size may vary based on various factors, including, but not limited to differences in input and output CODECs, profiles, frames/sample rates, frame types, etc., as described in reference to FIGS. 3 and 4 of the specification. In one embodiment, the predicted size information of each frame is stored in a generated output 506 header. In one embodiment, in order for the output header 506 to match an output header constructed from an index table and sent in response to the user's original request, the factors affecting the predicted output size are held constant between serving the user's original request and the seek request.

In one embodiment, the process identifies 508 an offset correlating to a seek point selected by a user. A playback time may be identified by converting a seek byte offset requested by the client device to a time. In one embodiment, the seek offset is identifies 508 at a key frame located before the seek point selected by a user. A key frame may include an I frame.

In one embodiment, the process encodes 510 the sample starting with the key frame identified 508 as the offset. The encoding 510 converts or compresses a frame to an output format suitable for playback on a client e.g., 106. The process additionally sends 512 a subset of the transcoded file starting with the byte offset requested by the client device to the client device over the network 110, wherein the client device decodes the frames and streams the audio or video on a display of the client 106.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of modules (e.g., components, engines, or mechanisms), for example, as described in FIGS. 1 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations, e.g., as described with FIGS. 4, 7 on data stored as bits or binary digital signals within a machine memory (e.g., a computer memory 204 or storage 216). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., computer 200) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing MP4 frames to a client as they are transcoded by a server by predicting a size of the output frames and transcoding the output frames to match the predicted size through the disclosed principles herein. For example, the server encodes the text and image data such that the text data does not lose any resolution and can be rendered perfectly at any zoom level on the client device. Image data is considered less important to the browsing experience, however, as is delivered as a low resolution image data which may appear blocky and stretched out during an intermediate stage after the zoom in and before a hi-resolution image is retrieved and delivered to the client device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for encoding frames in a media sample, the method comprising:
   receiving metadata associated with the sample, the metadata comprising a size of at least one input frame in the sample;
   predicting a size of an output frame encoded from an input frame in the sample, the output frame having a format decodeable by a client device;
   encoding the input frame;
   comparing a size of the encoded frame to the predicted size of the output frame;
   limiting, in response to the size of the encoded frame exceeding the predicted size of the output frame, a number of reprocessing attempts for the encoded frame to a pre-determined number of attempts and reprocessing the encoded frame; and
   comparing a size of a reprocessed version of the encoded frame with the predicted size of the output frame and performing one of:
      padding, if the reprocessed version of the encoded frame is smaller than the predicted size of the output frame, the reprocessed version of the encoded frame to match its size to the predicted output frame, and
      setting, if the reprocessed version of the encoded frame exceeds the predicted size of the output frame and further reprocessing of the encoded frame exceeds the pre-determined number of attempts, the encoded frame as at least one of a skip frame and a dropped frame.

2. The method of claim 1, wherein the metadata is parsed to extract a size of an input frame in the sample, the metadata comprising a first part of the sample and wherein the input frame format includes at least one of, H.264, advanced audio coding and MPEG-4 file formats.

3. The method of claim 1, wherein a size of the output frame is predicted based on a relationship between the input frame and the output frame, the relationship including at least one of, differences in an input and output coder-decoder, differences in a spatial resolution of the input and output frames, differences in arithmetic encoding of the sample and an output encoder, differences in frame rates and sample rates of the input sample and the output frame, and differences in frame type between the input frame and the output frame.

4. The method of claim 1, wherein padding comprises adding data at least one of before and after the output frame to increase its size.

5. The method of claim 1, wherein if the encoded frame is set as at least one of a skip frame and a dropped frame and wherein reprocessing the next frame in the sample exceeds the pre-determined number of reprocessing attempts, the method further comprising setting a portion of the next frame as skip frame and encoding the other portion of the next frame.

6. The method of claim 1, wherein a prediction of the output frame size includes a size larger than a predicted output frame enabling an encoder to recover visual quality by transcoding a frame that is larger than its predicted size.

7. The method of claim 1, wherein reprocessing the encoded frame to a smaller size comprises at least one of re-encoding the encoded frame and quantizing the encoded frame to reduce its bitrate.

8. The method of claim 1, wherein the source files are stored in an ingress cache and the transcoded frames are stored in an egress cache.

9. The method of claim 1, further comprising:
receiving a seek point from a user, the seek point comprising a location wherein a user wants to stream the sample;
identifying a key frame located at least one of before the seek point and at the seek point;
transcoding the sample by encoding the key frame; and
sending the transcoded sample to the user, the transcoded sample beginning with the seek point received from the user.

10. The method of claim 9, wherein the seek point comprise at least one of a time or a byte within the video sample.

11. The method of claim 9, wherein the key frame before the seek point comprises an I-frame.

12. The method of claim 9, wherein transcoding starts from at least one of the key frame to enable generation of a predicted output header from the I-frame and before the I-frame if the seek position is before the I-frame.

13. A non-transitory computer-readable storage medium storing computer program instructions executable by a processor for encoding frames in a media sample, the computer program instructions comprising instructions for:
receiving metadata associated with the sample, the metadata comprising a size of at least one input frame in the sample;
predicting a size of an output frame encoded from an input frame in the sample, the output frame having a format decodeable by a client device;
encoding the input frame;
comparing a size of the encoded frame to the predicted size of the output frame;
limiting, in response to the size of the encoded frame exceeding the predicted size of the output frame, a number of reprocessing attempts for the encoded frame to a pre-determined number of attempts and reprocessing the encoded frame; and
comparing a size of a reprocessed version of the encoded frame with the predicted size of the output frame and performing one of:
padding, if the reprocessed version of the encoded frame is smaller than the predicted size of the output frame, the reprocessed version of the encoded frame to match its size to the predicted output frame; and
setting, if the reprocessed version of the encoded frame exceeds the predicted size of the output frame and further reprocessing of the encoded frame exceeds the pre-determined number of attempts, the encoded frame as at least one of a skip frame and a dropped frame.

14. The computer-readable storage medium of claim 13, wherein a size of the output frame is predicted based on a relationship between the input frame and the output frame, the relationship including at least one of, differences in an input and output coder-decoder, differences in a spatial resolution of the input and output frames, differences in arithmetic encoding of the sample and an output encoder, differences in frame rates and sample rates of the input sample and the output frame, and differences in frame type between the input frame and the output frame.

15. The computer-readable storage medium of claim 13, wherein if the encoded frame is set as at least one of a skip frame and a dropped frame and wherein reprocessing the next frame in the sample exceeds the pre-determined number of re-processing attempts, the method further comprising setting a portion of the next frame as skip frame and encoding the other portion of the next frame.

16. The computer-readable storage medium of claim 13, wherein reprocessing the encoded frame to a smaller size comprises at least one of re-encoding the encoded frame and quantizing the encoded frame to reduce its bitrate.

17. The computer-readable storage medium of claim 13, further comprising instructions for:
receiving a seek point from a user, the seek point comprising a location wherein a user wants to stream the sample;
identifying a key frame located at least one of before the seek point and at the seek point;
transcoding the sample by encoding the key frame; and
sending the transcoded sample to the user, the transcoded sample beginning with the seek point received from the user.

* * * * *

UNITED STATES PATENT AND TRADEMARK OFFICE
CERTIFICATE OF CORRECTION

PATENT NO. : 9,271,003 B2
APPLICATION NO. : 13/434764
DATED : February 23, 2016
INVENTOR(S) : Erik R. Swenson Page 1 of 1

It is certified that error appears in the above-identified patent and that said Letters Patent is hereby corrected as shown below:

On the Title Page

Item [57], Line 12, delete "the client to device to playback" and insert -- the client device to playback --.

Signed and Sealed this
Twenty-second Day of May, 2018

Andrei Iancu
*Director of the United States Patent and Trademark Office*